US011508026B2

(12) United States Patent
Marco et al.

(10) Patent No.: US 11,508,026 B2
(45) Date of Patent: Nov. 22, 2022

(54) SYSTEM FOR NAVIGATING TRANSPORTATION SERVICE PROVIDERS TO FULFILL TRANSPORTATION REQUESTS AUTHORIZED BY AN ORGANIZATION

(71) Applicant: Lyft, Inc., San Francisco, CA (US)

(72) Inventors: Talmon Marco, Tel Aviv (IL); Igor Magazinik, Ramat Gan (IL)

(73) Assignee: Lyft, Inc., San Francisco, CA (US)

( * ) Notice: Subject to any disclaimer, the term of this patent is extended or adjusted under 35 U.S.C. 154(b) by 1462 days.

(21) Appl. No.: 14/985,575

(22) Filed: Dec. 31, 2015

(65) Prior Publication Data

US 2017/0193626 A1 Jul. 6, 2017

(51) Int. Cl.
*G06Q 50/30* (2012.01)
*G06Q 10/02* (2012.01)

(52) U.S. Cl.
CPC .............. *G06Q 50/30* (2013.01); *G06Q 10/02* (2013.01)

(58) Field of Classification Search
CPC ........ G06Q 10/08; G06Q 20/10; G06Q 50/30; G06Q 20/405; G06Q 10/02
USPC ................................................. 705/5, 13, 39
See application file for complete search history.

(56) References Cited

U.S. PATENT DOCUMENTS

| 8,014,756 | B1 | 9/2011 | Henderson | |
|---|---|---|---|---|
| 2002/0099599 | A1* | 7/2002 | Minassian | G06Q 10/08 705/13 |
| 2002/0174030 | A1* | 11/2002 | Praisner | G07F 7/08 705/39 |
| 2006/0100909 | A1* | 5/2006 | Glimp | G16H 40/20 128/898 |
| 2006/0143125 | A1* | 6/2006 | Cartwright | G06Q 20/102 705/40 |
| 2006/0259353 | A1* | 11/2006 | Gutmann | G06Q 10/02 705/13 |
| 2011/0238289 | A1 | 9/2011 | Lehmann et al. | |
| 2011/0301985 | A1 | 12/2011 | Camp et al. | |
| 2012/0209640 | A1 | 8/2012 | Hamper | |
| 2013/0054281 | A1 | 2/2013 | Thakkar et al. | |
| 2013/0124279 | A1 | 5/2013 | Bodin et al. | |
| 2013/0325735 | A1* | 12/2013 | Bellmund | G06Q 10/1057 705/322 |

(Continued)

FOREIGN PATENT DOCUMENTS

JP 2009-086716 A 4/2009

OTHER PUBLICATIONS

Carson, Biz, "This investor has an interesting theory on what Google will do with its self-driving cars", Jun. 30, 2015, businessinsider. com, 7 pages (Year: 2015).*

(Continued)

*Primary Examiner* — Shannon S Campbell
*Assistant Examiner* — Freda A Nelson
(74) *Attorney, Agent, or Firm* — Keller Preece PLLC

(57) ABSTRACT

In one embodiment a first transportation request is received from a computing device of a member of an organization. It is determined that the first transportation request is authorized according to preapproval criteria associated with a travel account of the member of the organization, wherein the travel account is funded by the organization. The first transportation request is communicated to a transportation service provider to service the transportation request.

20 Claims, 5 Drawing Sheets

(56) References Cited

U.S. PATENT DOCUMENTS

| | | |
|---|---|---|
| 2014/0250122 A1* | 9/2014 | Fredericks ............. G06Q 10/02 |
| | | 707/736 |
| 2015/0066557 A1 | 3/2015 | Lichti |
| 2015/0339928 A1 | 11/2015 | Ramanujam |
| 2016/0042303 A1 | 2/2016 | Medina et al. |
| 2016/0110836 A1* | 4/2016 | Garg ...................... G06Q 50/30 |
| | | 705/13 |
| 2016/0301698 A1 | 10/2016 | Katara et al. |
| 2016/0321771 A1 | 11/2016 | Liu et al. |
| 2016/0332535 A1 | 11/2016 | Bradley et al. |
| 2017/0228683 A1 | 8/2017 | Hu et al. |

OTHER PUBLICATIONS

Non-Final Office Action dated Apr. 6, 2018, on U.S. Appl. No. 14/966,760.
Final Office Action dated May 8, 2019, on U.S. Appl. No. 14/966,760.
Non-Final Office Action dated Nov. 6, 2018, on U.S. Appl. No. 14/966,760.

* cited by examiner

SYSTEM FOR NAVIGATING TRANSPORTATION SERVICE PROVIDERS TO FULFILL TRANSPORTATION REQUESTS AUTHORIZED BY AN ORGANIZATION

TECHNICAL FIELD

This disclosure relates in general to the field of mobile applications and, more particularly, to a system for navigating transportation service providers to fulfill transportation requests authorized by an organization.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a first transportation request is received from a computing device of a member of an organization. It is determined that the first transportation request is authorized according to preapproval criteria associated with a travel account of the member of the organization, wherein the travel account is funded by the organization. The first transportation request is communicated to a transportation service provider to service the transportation request.

Example Embodiments

Figure 1:
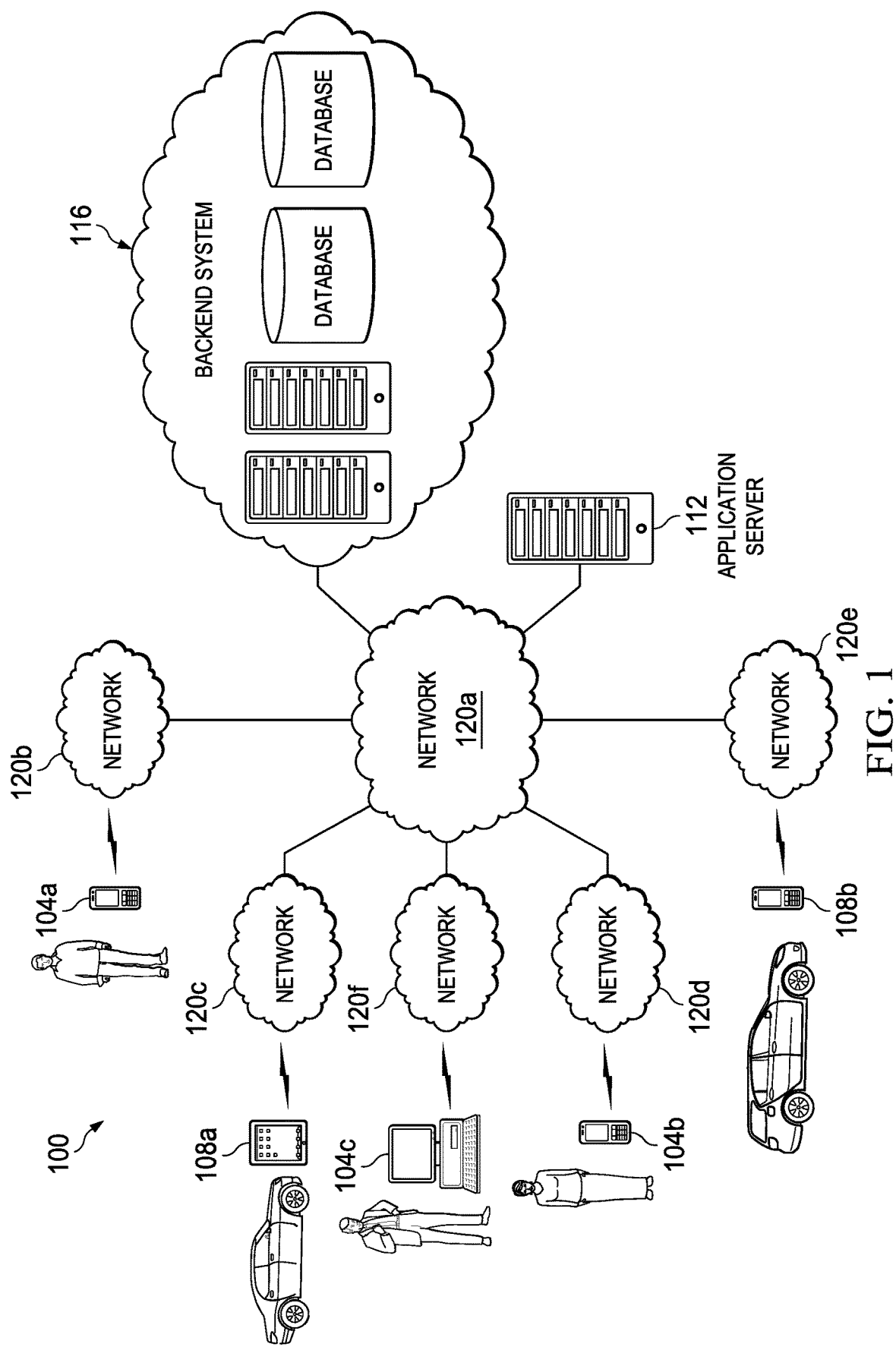
FIG. 1 illustrates a block diagram of a system for navigating transportation service providers to fulfill transportation requests authorized by an organization in accordance with certain embodiments.

FIG. 1 illustrates a block diagram of a system 100 for navigating transportation service providers to fulfill transportation requests authorized by an organization in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure, use the framework of a transportation service that directs drivers to transport passengers using automobiles (which are manually operated and/or autonomous). However, the teachings disclosed herein may be equally applicable to other types of transportation services utilizing any type of transportation service providers. As used herein, "transportation service provider" may refer to an entity that controls a transportation service that arranges for transportation of passengers based on transportation requests received from the passengers, individuals who work for such an entity (e.g., pilots, drivers, boat captains, train conductors, bus drivers, etc.), and/or the vehicles that provide the transportation (e.g., airplanes, automobiles, boats, trains, buses, etc.). References herein to actions performed by passengers and drivers and their respective computing devices may apply to passengers of any type of vehicle, operators of any type of vehicle, and their respective computing devices.

Various embodiments of the present disclosure may enhance the experience of organizations by simplifying payment for travel taken by members of the organizations. Various embodiments may allow an administrator of the organization to provide a transportation service with travel account information for various members of the organization as well as preapproval criteria for transportation requests generated by the members. Various embodiments may allow for transportation requests that are made in connection with a member's role in the organization to be automatically approved and paid for out of a travel account funded by the organization and then serviced by the appropriate transportation service provider. Various embodiments may provide technical advantages such as minimizing communications between computing devices of an organization and a transportation service to approve requests made by members of the organization, reducing the amount of paperwork and computing device processing associated with obtaining approval for reimbursement of travel expenses from an organization, or other technical advantages.

An organization may be any suitable group of individuals. For example, an organization may comprise a business entity, a civic organization, a non-profit organization, a religious denomination, a baseball team, or other suitable group. Members of the organization may be employees, board members, owners, or volunteers of the organization, or may have any other suitable relationship with the organization.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), car preference information (e.g., what models or color of car the user prefers), information identifying an organization that the passenger is a member of, information identifying a travel account of the passenger with the organization, or other account information.

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The passenger may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's computing device is not logged in to the transportation service through the driver application), or the driver may be "inactive," meaning that the driver only desires to receive particular requests meeting certain exception criteria specified by the driver.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
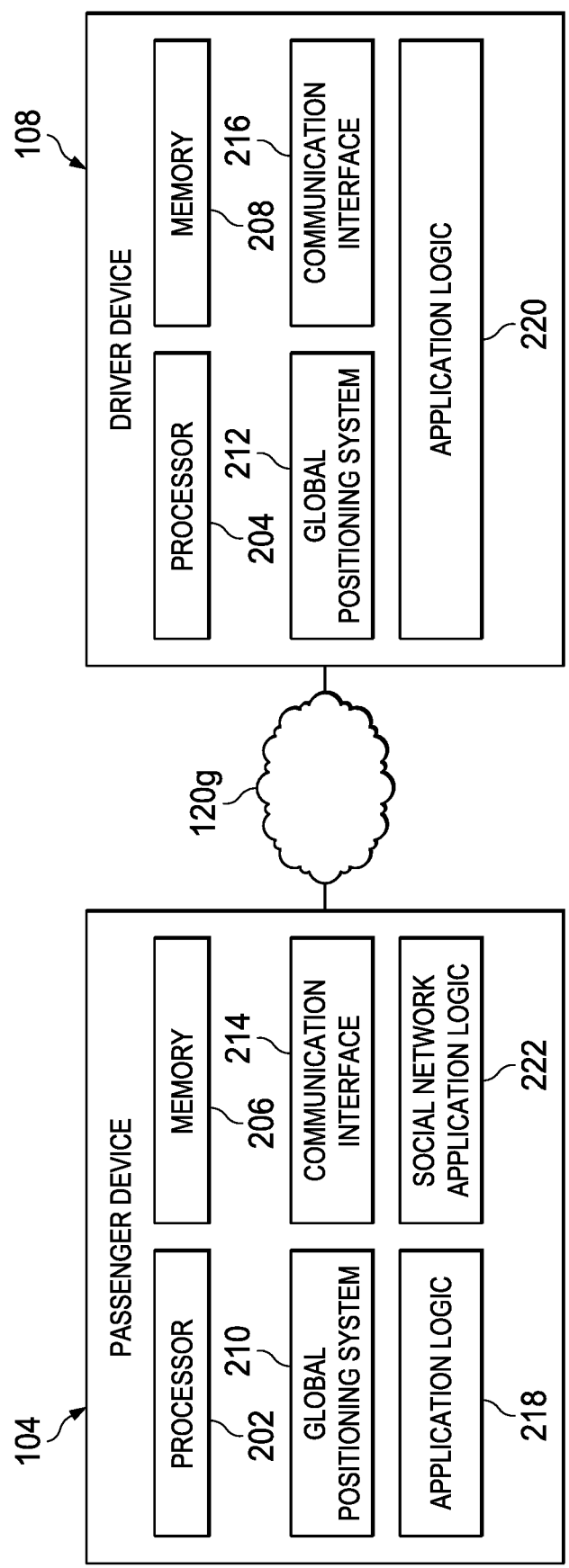
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a passenger that is a member of an organization, a passenger that is not a member of an organization, or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In various embodiments, a member of an organization or other passenger is a subscriber to the transportation service. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processors 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Passenger application logic 218 may include logic providing, at least in part, the functionality of the passenger application described herein. Similarly, driver application logic 220 may include logic providing, at least in part, the functionality of the driver application described herein. In a particular embodiment, the logic of devices 104 and 108 may include software that is executed by processor 202 and 204. However, "logic" as used in this Specification, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the passenger application, application logic 218 may provide additional features for the passenger application to enhance a passenger's experience.

In various embodiments, passenger application logic 218 may provide information associated with a travel account of a member of an organization. For example, the member may be able to view one or more preapproval criteria that specify transportation requests that will be paid for by the organization (through a payment source associated with the travel account). In particular embodiments, passenger application logic 218 may allow a member to link a payment source provided by the organization with a travel account of the member, such that the transportation service may charge costs for transportation requests to the payment source for particular requests using criteria (e.g., preapproval criteria, quota information, or other criteria) provided by the organization (e.g., through an administrator of the organization).

In particular embodiments, information associated with the preapproval criteria may aid the member in constructing a transportation request through passenger application logic 218. For example, in some embodiments, the preapproval criteria might specify that rides to or from a worksite of the organization or a location of a customer or vendor of the organization or other locations (or between such locations) are preapproved and will be paid for by the organization. Accordingly, passenger application logic 218 might include a list of such locations and allow the user to select the location from the list when entering in a pickup and/or destination location in a transportation request.

In various embodiments, preapproval criteria may be used in conjunction with one or more travel quotas to determine whether transportation requests will be paid for and/or authorized by the organization. The quotas may be associated with the travel account of the member. A quota may specify a limit on travel by the member that will be paid for by the organization. A quota may specify any suitable limit, such as a mileage limit, a monetary limit, a limit for the number of request, or other suitable limit. A quota may be associated with any suitable time period (e.g., the quota may be a daily quota or a yearly quota), and the quota may or may not be reset at the expiration of each time period. Passenger application logic 218 may provide the current status of a quota to the member. For example, the member may view an amount of the quota that has been used, an amount of the quota that remains, when the quota will be reset, a list of transportation requests (and associated information) that have counted against the quota, or other suitable information regarding the quota.

In various embodiments, passenger application logic 218 may allow a member to annotate transportation requests with notes which may be stored by data store 304 and/or organization computing infrastructure 336. For example, the member may use the note to indicate a purpose for the trip and whether the trip was related to the organization or of a personal nature. In particular embodiments, such notes may be communicated by backend server 302 or passenger application logic 218 to organization computing infrastructure 336 for accounting reasons, such as to aid in the determination of whether a particular transportation request should be paid for by the organization or by the member.

In a particular embodiment, a user may supply login credentials for a social network system (e.g., FACEBOOK) or other social media system (e.g., TWITTER) to the transportation service through passenger application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In various embodiments, the social network system may provide any of the functionality listed above with respect to passenger application logic 218 in allowing a user to request a ride and may relay received requests for rides to backend system 116 along with any suitable identifying information about the user to facilitate pickup by a driver.

Figure 3:
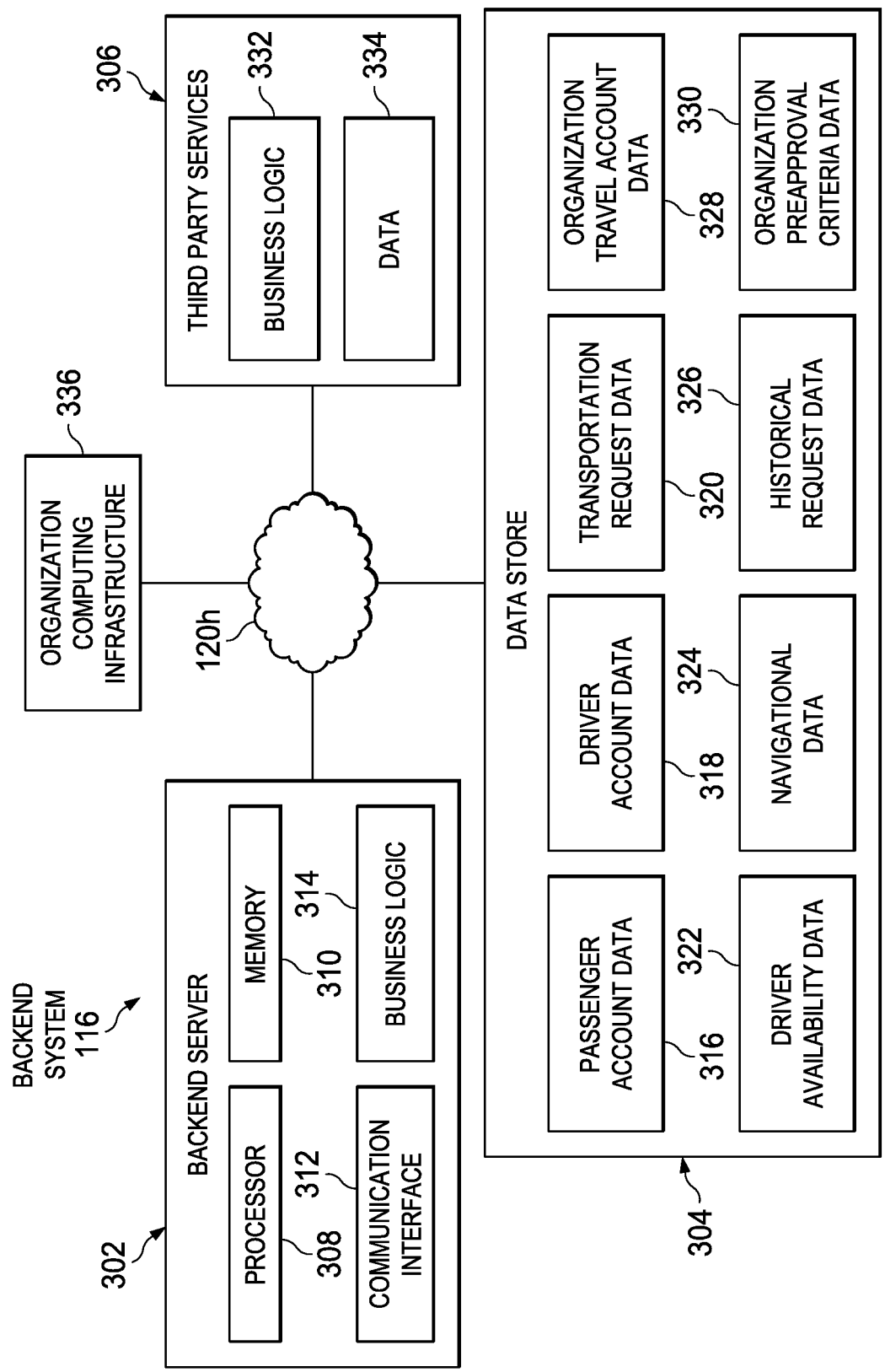
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service and organization described herein. In the embodiment depicted, backend system includes backend server 302, data store 304, third party services 306, and an organization's computing infrastructure 336 coupled together by network 120h. In various embodiments, backend server 302, data store 304, third party services 306, and/or organization computing infrastructure 336 may each comprise one or more physical devices (e.g., servers or other computing devices) providing the functionality described herein. In some embodiments, one or more of backend server 302, data store 304, third party services 306, or organization computing infrastructure 336 (or portions thereof) are deployed using a cloud service and may comprise one or more virtual machines or containers. In a particular embodiment, backend server 302 and data store 304 are controlled by the transportation service, while third party services 306 and organization computing infrastructure 336 are controlled by third party entities.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, organization computing infrastructure 336, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB). Data store 304 may be located on one or more computing devices that are distinct from backend server 302 or on the same device as at least a portion of backend server 302. Any of the information stored by data store 304 could additionally or alternatively be stored locally in memory 310 temporarily or persistently.

In the embodiment depicted, data store 304 includes passenger account data 316, driver account data 318, transportation request data 320, driver availability data 322, navigational data 324, historical request data 326, organization travel account data 328, and organization preapproval criteria data 330. The various data may be updated at any suitable intervals.

Passenger account data 316 may include any suitable information associated with accounts of subscribers to the transportation service, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles. In particular embodiments, passenger account data 316 of a passenger may include an indication of whether the passenger is a member of an organization, whether transportation requests from the passenger should be checked against preapproval and/or quota information (e.g., stored in organization travel account data 328 and/or organization preapproval criteria data 330) specified by the organization, and/or identifying information of a travel account of the passenger that is funded by the organization.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information.

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

Organization travel account data 328 may include information associated with travel accounts of members of an organization. A member may have a travel account that is funded by the organization. Information associated with a travel account may include any suitable information, such as one or more bank account numbers, debit card numbers, credit card numbers, or other identifying information associated with a payment source funded by the organization. The information may also include information associated with one or more quotas that apply to the travel account.

In some embodiments, organization travel account data 328 may include a record of transportation requests that were made by a member of the organization and any associated information, such as whether the request was approved based on preapproval criteria, whether the request was applied against a quota of the member, whether the request (or a portion thereof) was paid for by the organization, or other suitable information associated with the requests. In various embodiments, such information or a portion thereof may be provided by backend server 302 to organization computing infrastructure 336 at periodic intervals, after each transportation request is completed, or in response to a request from organization computing infrastructure 336.

Organization preapproval criteria data 330 may include preapproval criteria received from an organization (e.g., from an administrator of the organization via organization computing infrastructure 336). The preapproval criteria may specify types of transportation requests for various users that are preapproved for payment by the organization. In various embodiments, at least some of the preapproval criteria may be applicable to multiple or all members of the organization and at least some of the preapproval criteria may be member specific. In particular embodiments, each entry including a criterion may include an indication of which member(s) the criterion applies to. Alternatively, organization preapproval criteria data 330 may store a criteria file for each member specifying the preapproval criteria applicable to the member.

Any suitable preapproval criteria may be stored by organization preapproval criteria data 330 for use by backend server in authorizing transportation requests according to the preapproval criteria. In various embodiments, preapproval criteria may specify types of rides that are preapproved by specifying acceptable values for any of the parameters of a transportation request described herein. In various embodiments, the preapproval criteria includes information associated with the organization such that it may be used to limit preapproved travel to travel taken by the member in connection with the member's responsibilities to the organization.

For example, the criteria may specify one or more pickup locations, destination locations, regions, or routes that are preapproved. In various embodiments, all rides from a preapproved pickup location may be authorized (i.e., for payment by the organization) or rides from a preapproved pickup location may be authorized if one or more additional criteria are met (e.g., the ride takes place during a specified timeframe such as standard business hours or a different timeframe associated with the pickup location such as a timeframe associated with a appointment the member has at the pickup location in connection with the member's responsibilities with the organization). Similarly, in various embodiments, all rides to a preapproved destination location may be authorized or rides to a preapproved destination location may be preapproved if one or more additional criteria are met (e.g., the ride takes place during a specified timeframe such as standard business hours or a different timeframe associated with the destination location such as a timeframe associated with an appointment the member has at the destination location in connection with the member's responsibilities with the organization). In particular embodiments, rides within a particular geographic region may be preapproved. For example, a salesman may be preapproved for rides within a particular region to which the salesman is assigned. In particular embodiments, particular routes from a pickup location to a destination location may be preapproved. For example, a route between the member's residence and the member's workplace may be preapproved. As another example, a route from a first customer's location to a second customer's location may be preapproved. In a particular embodiment, a route may specify at least two locations. In various embodiments, any locations specified in the preapproval criteria may be associated with a degree of variance with one or more of the locations (e.g., the actual locations specified in the transportation request may vary from the locations specified in the preapproval criteria by a specified amount and still be considered to match the locations in the preapproval criteria).

As another example, the criteria might specify a time period during which rides are preapproved. For example, the criteria may specify that rides during work hours associated with the member are preapproved. As another example, the criteria may specify any other suitable timeframes in which rides may be preapproved. In various examples, the timeframes specified may be used in combination with other preapproval criteria (such as in the examples mentioned above). The time periods may be compared with times associated with the transportation requests in any suitable manner. For example, a preapproval time period may match a transportation request if the pickup time falls within the time period, if the arrival time falls within the time period, if any time during the servicing of the transportation request falls within the time period, if the transportation request is made within the time period, if the entire time between the pickup time and the arrival time fall within the time period, or other suitable time associated with the transportation request falls within the time period.

In various embodiments, preapproval criteria that is not specifically associated with the organization (though it may be specified by the organization) may be used in addition or as an alternative to organization-specific criteria. For example, the criteria might specify a maximum distance or price for a ride. As another example, the criteria may specify a maximum number of rides over a particular time period (such as a day, a week, a month, a year, etc.).

The preapproval criteria may specify any suitable combinations of criteria that when met result in preapproval of a ride. For example, the preapproval criteria may specify that when any one or more of a plurality of different criteria are met, the ride is preapproved. As another example, the authorizing party may specify that multiple criteria must be met for the ride to be preapproved. In various embodiments, any of the criteria described herein may be combined together to provide a combination of preapproval criteria that when satisfied results in preapproval of a transportation request.

In particular embodiments, at least a portion of the preapproval criteria may be derived from one or more files associated with the organization. For example, preapproval criteria may be derived from calendar appointments of a member of the organization; customer, vendor, employee, member, or other contact lists of the organization; or other suitable files kept by the organization. In various embodiments, such files may be processed (e.g., by a computing device of organization computing infrastructure 336 or backend server 302) into a format usable by backend server 302 or other computing device that applies the preapproval criteria to transportation request. Any of the criteria listed herein may be derived from files of the organization. For example, a calendar file or other scheduling file of a member may be processed to extract a plurality of pickup locations, destination locations, regions, or routes associated with travel the member will make in connection with his relationship with the organization. In particular embodiments, each of these locations, regions, or routes may also be associated with a timeframe corresponding to a time of an appointment at the particular location, such that transportation requests matching the location or route are only preapproved during a time period connected to the calendar appointment. As another example, a contact list (e.g., a customer list) of the organization may be processed to extract a plurality of locations corresponding to addresses of individuals or entities of the list that may be used as preapproval criteria.

Backend server 302 may also communicate with one or more organization computing infrastructures 336. A computing infrastructure of an organization may comprise one or more computing devices associated with the organization. In various embodiments, these computing devices may comprise any suitable network having any suitable network nodes. The computing devices may have components similar to those described herein with respect to other devices. For example, the computing devices of the organization computing infrastructure 336 may include processors, memory, various logic, and communication interfaces, among other components. In various embodiments, organization computing infrastructure 336 includes one or more computing devices (e.g., which may be controlled by an administrator of the organization) that may communicate with backend server 302 to provide various information associated with members of the organization, such as passenger account data 316, organization travel account data 328, organization preapproval criteria data 330, manual approval for particular transportation requests, or other suitable data. One or more computing devices of the organization computing infrastructure may also receive information from the backend server 302 or data store 304, such as transportation requests and associated information generated by members of the organization and associated accounting records (e.g., denoting reasons for transportation requests specified by members, messages indicating which transportation requests were preapproved and which were not, etc.).

In various embodiments, backend server 302 may access third party services 306 through business logic 332 to access data 334. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 332 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316, organization travel account data 328, and/or driver account data 318 (or information supplied by the passenger at the time of the transaction). The backend server 302 may also receive ratings associated with the trip for the passenger and driver and store these ratings in data store 304.

Figure 4:
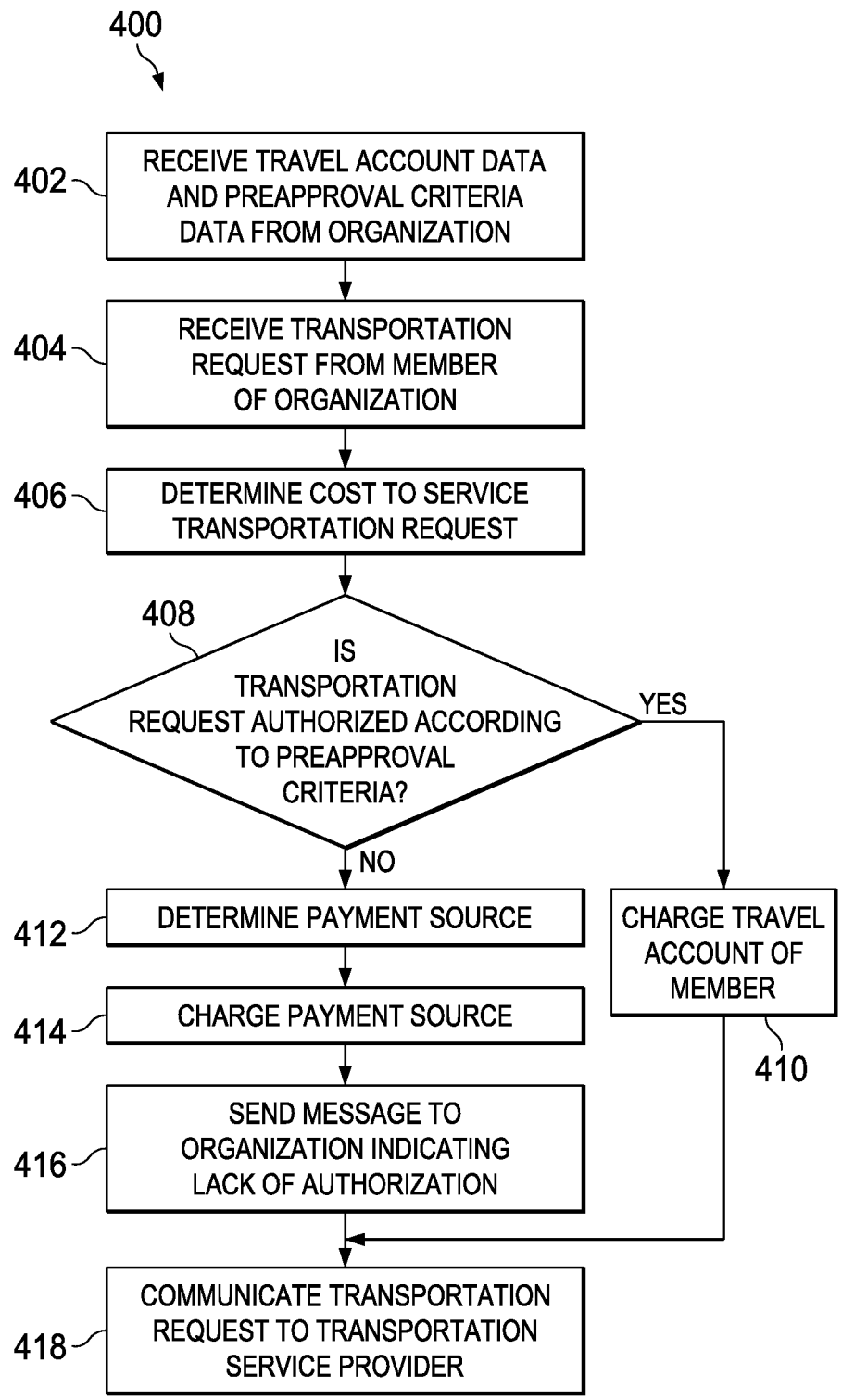
FIG. 4 illustrates a method for authorizing transportation requests based on organizational preapproval criteria in accordance with certain embodiments.

FIG. 4 illustrates a method for authorizing transportation requests based on organizational preapproval criteria in accordance with certain embodiments. Various steps of FIG. 4 may be performed by any suitable computing device(s), e.g., backend server 302, a computing device of organization computing infrastructure, or one or more other computing devices that are operable to receive transportation requests from members of one or more organizations and send transportation requests to one or more transportation service providers (e.g., separate transportation companies, operators of vehicles, or vehicles). Although various steps are described herein as being performed by backend server 302, such steps could be performed by other computing devices includes computing devices of the organization or an intermediary between the organization and one or more transportation service providers.

At step 402, travel account data and preapproval criteria data are received from an organization. For example, backend server 302 and/or data store 304 may receive any suitable information of organization travel account data 328 or organization preapproval criteria data 330 from one or more computing devices of organization computing infrastructure 336. Such data may be stored in data store 304 or processed by backend server 302 into a format suitable for use by backend server 302 and then stored in data store 304.

At step 404, a transportation request is received from a member of the organization. The transportation request may specify any of the information described herein with respect to various transportation requests. In various embodiments, the backend server 302 may determine whether this transportation request should be checked against preapproval and/or other data associated with an organization. For example, passenger account data 316, organization travel account data 328, and/or organization preapproval criteria data may be accessed to determine whether the transportation request is from a member of an organization and if so, which actions should be taken regarding the transportation request. If the transportation request is not from a member of an organization, it may be processed in any suitable manner as described in various embodiments above. If the transportation request is from a member of an organization, one or more steps of the method 400 may be performed with respect to the request.

At step 406, a cost to service the transportation request may be determined. In various embodiments, backend server 302 may determine the cost of the request based on any suitable information, such as the pickup location and destination location specified in the transportation request, the availability of drivers, or any other suitable data. In other embodiments, if a computing device receiving the transportation request is controlled by the organization (e.g., is within organization computing infrastructure 336) or acts as an intermediary between the organization and one or more transportation service providers (such as the transportation service implemented by backend server 302), the computing device may request a price quotation from one (or more) of the transportation service providers to determine the cost of the transportation request.

At step 408, it is determined whether the transportation request is authorized according to preapproval criteria. Backend server 302 may retrieve one or more preapproval criteria that are applicable to the transportation request (e.g., by retrieving preapproval criteria applicable to the organization and/or the specific member transmitting the transportation request) and determine whether the transportation request satisfies one or more conditions for preapproval specified by the preapproval criteria. If the transportation request is authorized a travel account of the member is charged at step 410 and the transportation request is communicated to the relevant transportation service provider to arrange for servicing of the transportation request at step 418. In other embodiments, rather than being charged at this time, a notation may be made that the travel account of the member should be charged (and the actual charging may take place at a later time, such as after the transportation request is fulfilled). The travel account of the member may be specific to the member or may be shared by the member with other members of the organization. In various embodiments, the travel account is paid for directly by the organization or it may be an account of the user in which the user pays for the charge but is automatically reimbursed from the organization at a later time. In any event, the funds for the travel account are ultimately provided by the organization rather than the member.

If it is determined that the transportation request is not authorized according to the preapproval criteria at step 408, then a payment source is determined at step 412. In various embodiments, the determination of the payment source may include any suitable operations.

In some embodiments, the determination of the payment source may include requesting manual approval of the transportation request. In particular embodiments, if the transportation request is not authorized according to the preapproval criteria, the transportation request may be sent to one or more administrators of the organization for manual approval. In various embodiments, backend server 302 may notify the member that the transportation request did not meet the preapproval criteria and may be given an option to seek manual approval for the transportation request. In response to an affirmative selection by the member, approval may be requested from a computing device of an administrator of the organization. A message requesting manual approval may include any of the information described above that may be entered in association with the generation of the transportation request by the member or other information associated with the transportation request (e.g., any of the information described herein that would normally be presented to a passenger such as a cost of the request, a distance of the request, etc.). As one example, the request may include any comments appended to the request by the member explaining the purpose of the request. In one embodiment, the message requesting authorization is presented to the administrator through application logic 218 or other suitable logic (e.g., a text message application, an email application, a voice call, an instant messaging application, a social networking application, or other suitable application or program) of a computing device of the administrator of the organization. The administrator may utilize any suitable logic (such as one of these various applications) to send one or more messages (e.g., to backend server 302) authorizing the transportation request. If the request is authorized by the administrator, the travel account of the user may be used to pay for the transportation request. If the request is denied by the administrator or a response is not received from the administrator after a predetermined period of time or prior to a time in which the transportation request needs to be submitted to the relevant or payment needs to be made, it may be determined that the user will pay for the transportation request or one or more additional operations may be performed in order to determine the payment source.

In various embodiments, if it is determined that the transportation request wasn't authorized according to the preapproval criteria, that a quota of the member would be affected by the transportation request, and/or that the member (rather than the organization) is to pay for the transportation request, the member is notified (e.g., via passenger application logic 218 of passenger computing device 104) of such and (e.g., in response to the notification) is provided an opportunity to cancel or modify the transportation request.

As will be explained in greater detail in connection with FIG. 5, the determination of the payment source may involve accessing one or more quotas associated with the member's travel account to determine whether the member or the organization should pay for the transportation request.

In various embodiments, the payment source may be selected among the travel account of the member or one or more personal payment accounts (associated with a bank account, debit card, credit card, or other payment means) of the member. In particular embodiments, if a personal payment account of the member is to be used, the member may be prompted and given a chance to select among one or more personal payment accounts. The personal payment account may be said to be independent of the organization. The payment source is charged at step 414.

In particular instances, if a transportation request was not authorized according to the preapproval criteria, a message is sent to the organization indicating the lack of authorization at step 416. The message may be sent in any suitable instances, such as an instance when the travel account of the member is selected to be charged for the transportation request in spite of the preapproval criteria not being met. In some embodiments, the message may also be sent even if a personal payment account of the member is used for payment. For example, if the transportation request is later determined to be connected to the member's role in the organization and the member is reimbursed for the cost, the information sent to the organization may be used to improve the preapproval criteria specified by the organization.

At step 418, the transportation request is communicated to a transportation service provider. The transportation service provider may fulfill the transportation request and report back as to the actual cost of the request. In various embodiments, the method of 400 may be modified in that the cost to service the transportation request (and thus the actual charging of the cost to the determined payment source) is not performed until after the transportation request has been fulfilled. In various embodiments, operations performed may involve estimating the cost of the service transportation request at step 406 in order to determine whether the preapproval criteria or other information (e.g., a quota) applied to the transportation request is met.

Some of the steps illustrated in FIG. 4 may be repeated, combined, modified or deleted where appropriate, and additional steps may also be included. Additionally, steps may be performed in any suitable order or concurrently without departing from the scope of particular embodiments.

Figure 5:
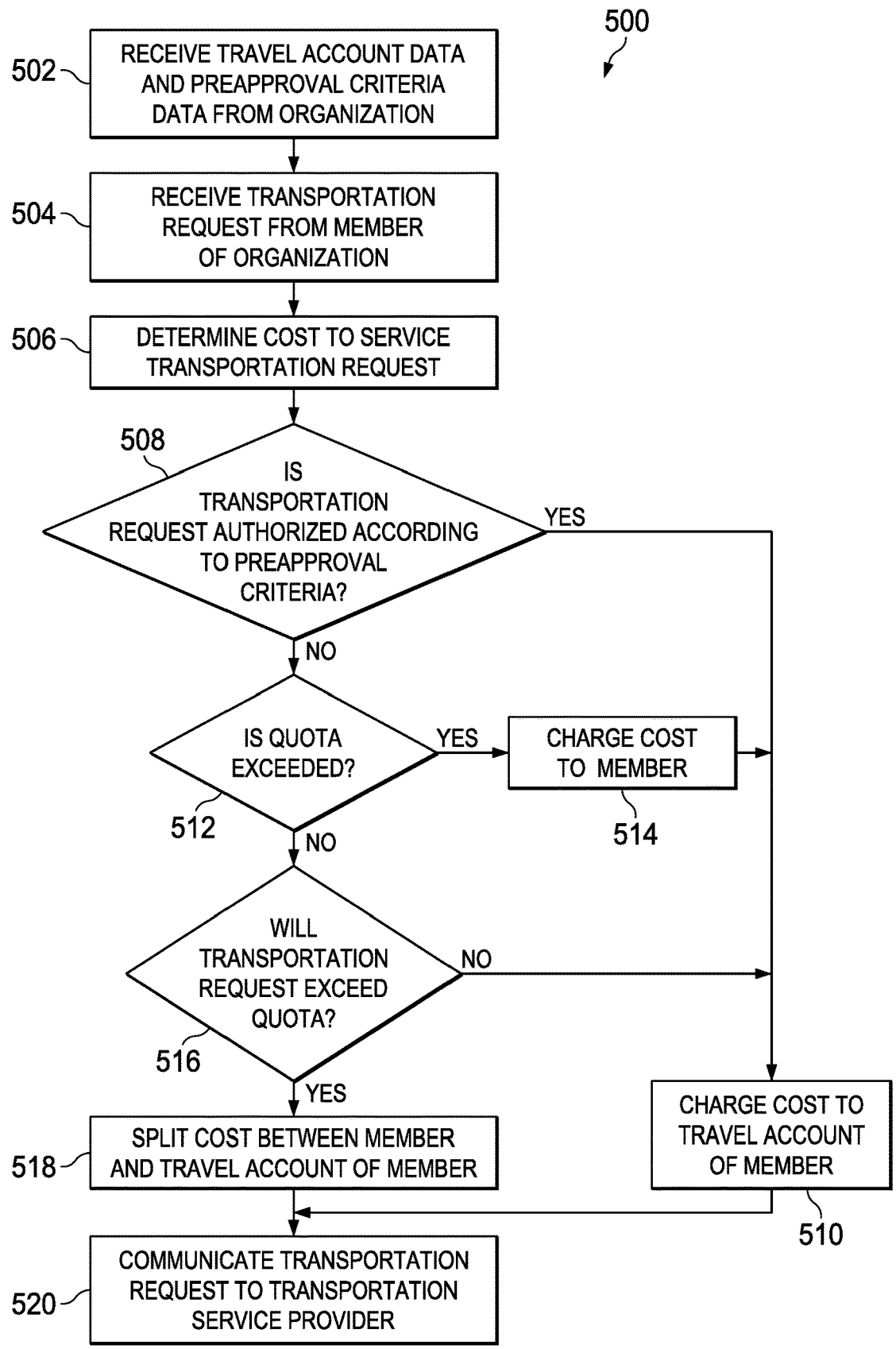
FIG. 5 illustrates a method for authorizing transportation requests based on organizational preapproval criteria and a quota in accordance with certain embodiments.

FIG. 5 illustrates a method for authorizing transportation requests based on organizational preapproval criteria and a quota in accordance with certain embodiments. Various steps of FIG. 5 may be performed by any suitable computing device(s), e.g., backend server 302, a computing device of organization computing infrastructure, or one or more other computing devices that are operable to receive transportation requests from members of one or more organizations and send transportation requests to one or more transportation service providers (e.g., separate transportation companies, operators of vehicles, or vehicles). Although various steps are described herein as being performed by backend server 302, such steps could be performed by other computing devices includes computing devices of the organization or an intermediary between the organization and one or more transportation service providers.

At step 502, travel account data and preapproval criteria data are received from an organization. At step 504, a transportation request is received from a member of the organization. At step 506, a cost to service the transportation request may be determined. In other embodiments, the cost may be estimated instead. At step 508, it is determined whether the transportation request is authorized according to preapproval criteria. If the transportation request is authorized, a travel account of the member is charged at step 510 and the transportation request is communicated to the relevant transportation service provider to arrange for servicing of the transportation request at step 520. In other embodiments, rather than being charged at this time, a notation may be made that the travel account of the member should be charged (and the actual charging may take place at a later time, such as after the transportation request is fulfilled).

If it is determined that the transportation request is not authorized according to the preapproval criteria at step 508, then it is determined at step 512 whether a quota associated with the member's travel account is exceeded. For example, a current status of the quota associated with the member's travel account may be retrieved and checked to see if mileage, cost, number of trips, or other parameter specified by the quota is already exceeded for the current quota period. If so, then the member's personal payment account is charged at 514 (or charged later after the transportation request is fulfilled). If not, then it is determined whether the fulfillment of the transportation request will cause the quota to be exceeded at step 516. If it will not, then the cost of the transportation request is charged to the travel account of the member at step 510 (alternatively the charge may occur after the transportation request is fulfilled). If the transportation request will cause the quota to be exceeded, then the cost may be split between the member's personal payment account and the travel account of the member. The cost may be split in any suitable manner. For example, a portion of the cost may be allocated to the travel account based on the fraction of the mileage or amount of money remaining unfilled in the quota divided by the total mileage or cost of the transportation request. Any other suitable allocation may be used. At step 520 the transportation request is communicated to the transportation service provider.

In various embodiments, after a transportation request has been charged against a quota (e.g., mileage or cost of the transportation request may be reduced from the remaining mileage or cost specified in the quota), the backend server 302 may determine that the request is authorized by the organization. For example, information associated with the transportation request may be communicated to an administrator of the organization (and optionally justification for the transportation request may be provided from the member to the administrator), and the administrator or other person of the organization may send an indication to the backend server 302 that the transportation request was authorized. In response to the determination that the response was authorized, the charge of the transportation request against the quota may be reversed by backend server 302 (e.g., mileage or cost of the transportation request may be credited to the quota).

In various embodiments, manual approval from the organization may be sought at any suitable time in relation to the steps of method 500. For example, manual approval may be sought from the organization if the answer to query 508 is no or if the answer to 512 or 516 is yes. In various embodiments, the member may specify whether manual approval is to be sought in response to a notification that the request is to be charged to the member's personal payment account or applied to the member's quota.

Some of the steps illustrated in FIG. 5 may be repeated, combined, modified or deleted where appropriate, and additional steps may also be included. Additionally, steps may be performed in any suitable order or concurrently without departing from the scope of particular embodiments.

It is also important to note that the steps in FIGS. 4-5 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
receiving, by a processing device of a server from a passenger computing device associated with a user, a first transportation request comprising a pickup location and a destination location;
accessing, by the processing device, an organization travel account data structure to determine, based on the first transportation request, that the user is a member of an organization that funds organization travel accounts;
identifying, by the processing device and within the organization travel account data structure, an organization travel account for the user, the organization travel account comprising both of a digital travel quota and preapproval criteria, wherein the digital travel quota comprises a predetermined number of transportation requests allotted to the organization travel account for the user during a quota time period;
determining, by the processing device, the first transportation request does not exceed the digital travel quota by accessing the organization travel account data structure to apply a reduction of one transportation request from a remaining amount of the predetermined number of transportation requests;
determining, by the processing device based on satisfaction of the preapproval criteria and the digital travel quota, that the first transportation request is authorized without transmitting a digital authorization message via a network to request approval from the organization; and
in response to determining that the first transportation request is authorized, transmitting, by the processing device, digital communications including navigational instructions to a driver computing device integrated within a self-driven vehicle for navigating the self-driven vehicle to the pickup location associated with the passenger computing device to fulfill the first transportation request.

2. The method of claim 1 wherein the preapproval criteria comprises a time period to be compared against one or more times specified by the first transportation request.

3. The method of claim 1, wherein the preapproval criteria comprises at least one location to be compared against one or more locations specified by the first transportation request.

4. The method of claim 1, wherein the preapproval criteria comprises at least one location and at least one timeframe associated with the at least one location.

5. The method of claim 1, further comprising:
providing, for display within a graphical user interface of the passenger computing device, a list of selectable options comprising one or more preapproved pickup locations or preapproved destination locations; and
receiving, as part of the first transportation request from the passenger computing device, an indication of a user input selecting at least one of a preapproved pickup location or a preapproved destination location that corresponds to the pickup location and the destination location, respectively.

6. The method of claim 1, further comprising reducing, in response to fulfilling the first transportation request, the remaining amount of the predetermined number of transportation requests.

7. The method of claim 1, further comprising:
receiving, from the passenger computing device, a second transportation request;
determining that the second transportation request is not authorized according to the preapproval criteria for the organization travel account of the user;
providing additional navigational instructions to a second driver computing device to direct the second driver computing device to fulfill the second transportation request; and
responsive to determining that the second transportation request is not authorized, applying a cost to service the second transportation request to an account independent of the organization.

8. The method of claim 1, wherein receiving the first transportation request comprising the pickup location and the destination location comprises receiving, via the passenger computing device, an indication of a voice command to select at least one of the pickup location or the destination location.

9. The method of claim 1, further comprising:
receiving, from the passenger computing device, a second transportation request;
determining that the second transportation request exceeds the digital travel quota based on the remaining amount of the predetermined number of transportation requests being insufficient;
providing additional navigational instructions to a second driver computing device to direct the second driver computing device to fulfill the second transportation request; and
responsive to determining that the second transportation request is not authorized, applying a cost to service the second transportation request to an account independent from the organization.

10. The method of claim 1, further comprising providing, for display within a graphical user interface of the passenger computing device, real-time updates of a location of the driver computing device relative to the pickup location for the passenger computing device while providing navigational instructions to the driver computing device.

11. The method of claim 1, further comprising, providing, for display within a graphical user interface of the passenger computing device, a current status update of the digital travel quota comprising an updated remaining amount of the predetermined number of transportation requests after applying the reduction of one transportation request to the remaining amount of the predetermined number of transportation requests.

12. The method of claim 1, further comprising determining satisfaction of the preapproval criteria by comparing, via the processing device, a preapproved route with a navigation route between the pickup location and the destination location.

13. The method of claim 1, further comprising:
identifying, by the processing device, a degree of variance between the pickup location and a preapproved pickup location or between the destination location and a preapproved destination location;
determining the degree of variance satisfies a threshold degree of variance; and
in response to determining the degree of variance satisfies the threshold degree of variance, determining the pickup location or the destination location satisfies the preapproval criteria.

14. An apparatus comprising:
a memory; and
a processing device coupled to the memory, the processing device to:
receive, from a passenger computing device associated with a user, a transportation request comprising a pickup location and a destination location;
accessing an organization travel account data structure to determine, based on the transportation request, that the user is a member of an organization that funds organization travel accounts;
identify, within the organization travel account data structure, an organization travel account for the user, the organization travel account comprising both of a digital travel quota and preapproval criteria, wherein the digital travel quota comprises a predetermined number of transportation requests allotted to the organization travel account for the user during a quota time period;
determine the transportation request does not exceed the digital travel quota by accessing the organization travel account data structure to apply a reduction of one transportation request from a remaining amount of the predetermined number of transportation requests;
determine, based on satisfaction of the preapproval criteria and the digital travel quota, that the transportation request is authorized; and
responsive to determining that the transportation request is authorized, transmit digital communications including navigational instructions to a self-driven vehicle for navigating the self-driven vehicle to the pickup location associated with the passenger computing device to fulfill the transportation request.

15. The apparatus of claim 14, wherein the processing device is further to:
provide, for display within a graphical user interface of the passenger computing device, a list of selectable options comprising one or more preapproved pickup locations or preapproved destination locations; and
receive, as part of the transportation request from the passenger computing device, an indication of a user input selecting at least one of a preapproved pickup location or a preapproved destination location that corresponds to the pickup location and the destination location, respectively.

16. The apparatus of claim 14, wherein the processing device is further toil determine satisfaction of the preapproval criteria by comparing a preapproved route with a navigation route between the pickup location and the destination location.

17. At least one computer-readable non-transitory media comprising one or more instructions that when executed by a processing device, cause the processing device to perform operations comprising:
receiving, from a passenger computing device associated with a user, a transportation request comprising a pickup location and a destination location;
accessing an organization travel account data structure to determine, based on the transportation request, that the user is a member of an organization that funds organization travel accounts;
identifying, within the organization travel account data structure, an organization travel account for the user, the organization travel account comprising both of a digital travel quota and preapproval criteria, wherein the digital travel quota comprises a predetermined number of transportation requests allotted to the organization travel account for the user during a quota time period;
determining the transportation request does not exceed the digital travel quota by accessing the organization travel account data structure to apply a reduction of one transportation request from a remaining amount of the predetermined number of transportation requests;
determining, based on satisfaction of the preapproval criteria and the digital travel quota, that the transportation request is authorized; and
in response to determining that the transportation request is authorized, transmitting, digital communications including navigational instructions to a self-driven vehicle for navigating the self-driven vehicle to the pickup location associated with the passenger computing device to fulfill the transportation request.

18. The at least one computer-readable non-transitory media of claim 17, wherein the operations further comprise:
providing, for display within a graphical user interface of the passenger computing device, a list of selectable options comprising one or more preapproved pickup locations or preapproved destination locations; and
receiving, as part of the transportation request from the passenger computing device, an indication of a user input selecting at least one of a preapproved pickup location or a preapproved destination location that corresponds to the pickup location and the destination location, respectively.

19. The at least one computer-readable non-transitory media of claim 17, wherein the operations further comprise determining satisfaction of the preapproval criteria by comparing a preapproved route with a navigation route between the pickup location and the destination location.

20. The at least one computer-readable non-transitory media of claim 17, wherein the operations further comprise providing, for display within a graphical user interface of the passenger computing device, real-time updates of a location of the self-driven vehicle relative to the pickup location for the passenger computing device while providing navigational instructions to the self-driven vehicle.

\* \* \* \* \*